(12) United States Patent
Barnett

(10) Patent No.: US 7,178,217 B2
(45) Date of Patent: Feb. 20, 2007

(54) TAPERING DEVICE FOR REMOVING PORTIONS OF A GYPSUM BOARD

(76) Inventor: Wayne B. Barnett, 1252 Woodland Ct., Joliet, IL (US) 60436

( * ) Notice: Subject to any disclaimer, the term of this patent is extended or adjusted under 35 U.S.C. 154(b) by 0 days.

(21) Appl. No.: 11/406,658

(22) Filed: Apr. 19, 2006

(65) Prior Publication Data

US 2006/0185151 A1 Aug. 24, 2006

Related U.S. Application Data

(63) Continuation-in-part of application No. 10/935,327, filed on Sep. 7, 2004, now abandoned.

(51) Int. Cl.
*B23P 13/04* (2006.01)
*B23C 1/20* (2006.01)
*B23C 3/00* (2006.01)

(52) U.S. Cl. .................. 29/557; 409/132; 409/178; 409/137

(58) Field of Classification Search .............. 409/137, 409/138, 180, 181, 182, 175, 178, 132; 144/136.95, 144/154.5; 407/53, 54, 57, 59, 63; 83/100; 29/557
See application file for complete search history.

(56) References Cited

U.S. PATENT DOCUMENTS

| | | | | |
|---|---|---|---|---|
| 2,569,874 A | * | 10/1951 | Stowell | 407/54 |
| 3,837,383 A | * | 9/1974 | Ko | 409/137 |
| 4,112,987 A | * | 9/1978 | Pachnik | 409/180 |
| 4,273,483 A | * | 6/1981 | Mendicino | 409/178 |
| 4,489,634 A | * | 12/1984 | Volk | 83/522.28 |
| 4,584,224 A | * | 4/1986 | Schneller | 428/60 |
| 4,735,531 A | * | 4/1988 | Boerckel et al. | 409/182 |
| 4,750,536 A | * | 6/1988 | Grisley | 409/137 |
| 5,084,972 A | * | 2/1992 | Waugh | 83/100 |
| 5,481,952 A | * | 1/1996 | MacLennan | 83/839 |
| 5,743,163 A | * | 4/1998 | Lavinder | 83/851 |
| 5,882,155 A | * | 3/1999 | Testa, Jr. | 409/132 |
| 5,931,072 A | * | 8/1999 | Shibata | 83/100 |
| 5,988,954 A | * | 11/1999 | Gaskin et al. | 409/137 |
| 6,443,676 B1 | * | 9/2002 | Kopras | 409/182 |
| 6,484,767 B2 | * | 11/2002 | Cameron | 144/154.5 |

* cited by examiner

*Primary Examiner*—Dana Ross
(74) *Attorney, Agent, or Firm*—Cherskov & Flaynik

(57) ABSTRACT

A device 10 and method for forming a non-tapered end 12 of a gypsum board 14 into a tapered configuration or portion 16 includes a rotary drive tool 18 that imparts rotary motion to a tool bit 20 removably secured thereto, a pair of oppositely disposed angle members 22 having cooperating base portions 24 configured to promote attaching a dust collection collar 17 to the base portions 24, the angle members 22 disposing and guiding the rotating tool bit 20 between outer paper walls 28 of a non-tapered end 12 of the gypsum board 14 to ultimately sever portions of gypsum from the non-tapered end 12 thereby forming a recess 32 without damaging the outer paper walls 28 of the gypsum board 14. The device 10 and method ultimately removes severed portions of gypsum from the recess 32, whereupon, the non-tapered end 12 of the gypsum board 14 is forcibly bent to form a tapered configuration, end edges 128 of the board 14 are secured together with tape 122 to prevent the board 14 from returning to a non-tapered configuration, and the gypsum board 14 is secured to a support structure 38 such that tapered portions 16 of adjacent gypsum boards 14 cooperate to promote a planar finished seam when tape and joint compound are applied thereto.

20 Claims, 14 Drawing Sheets

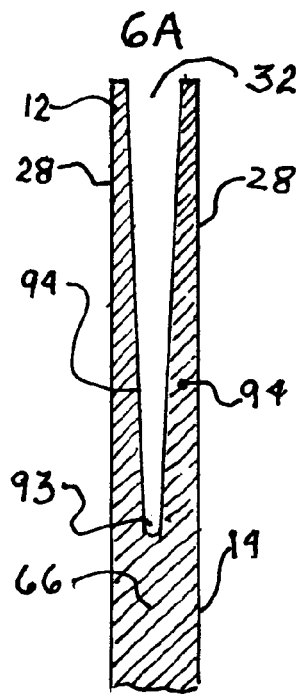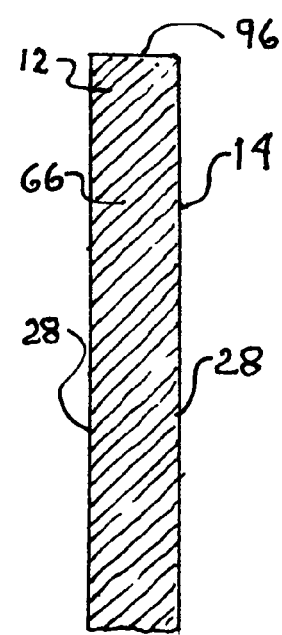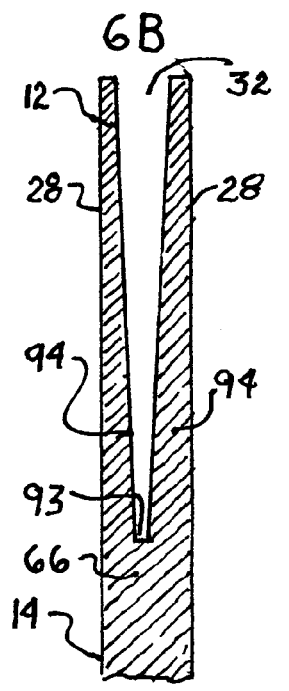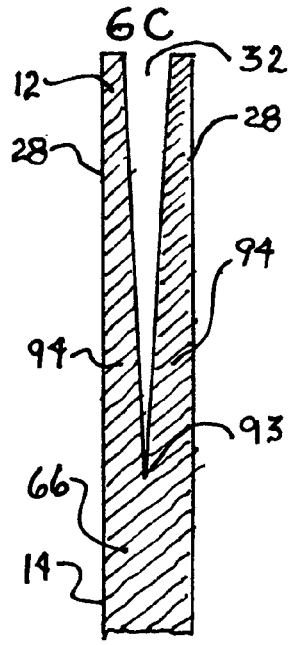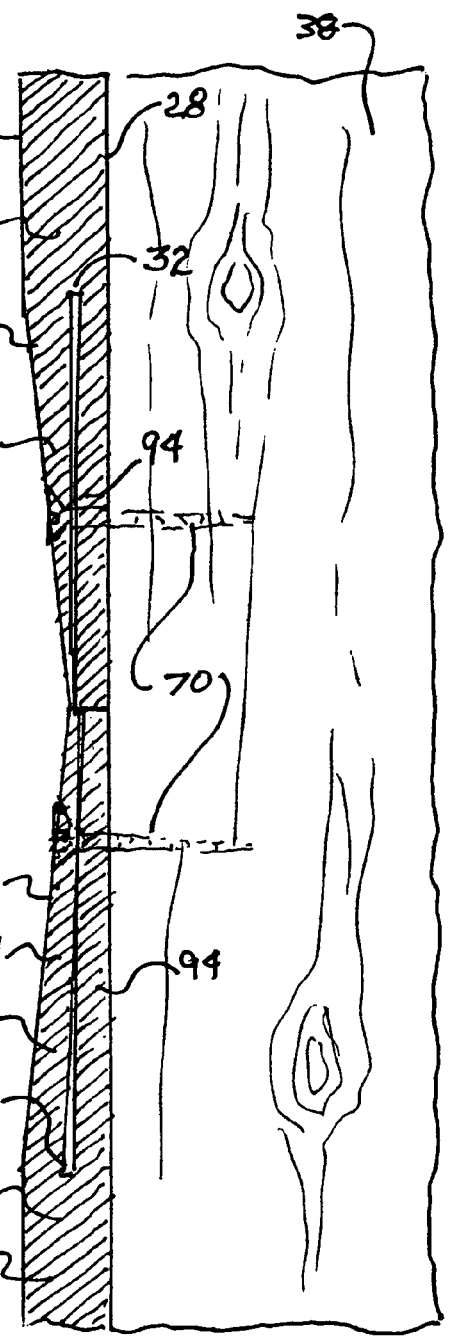
FIGURE 6
FIGURE 7

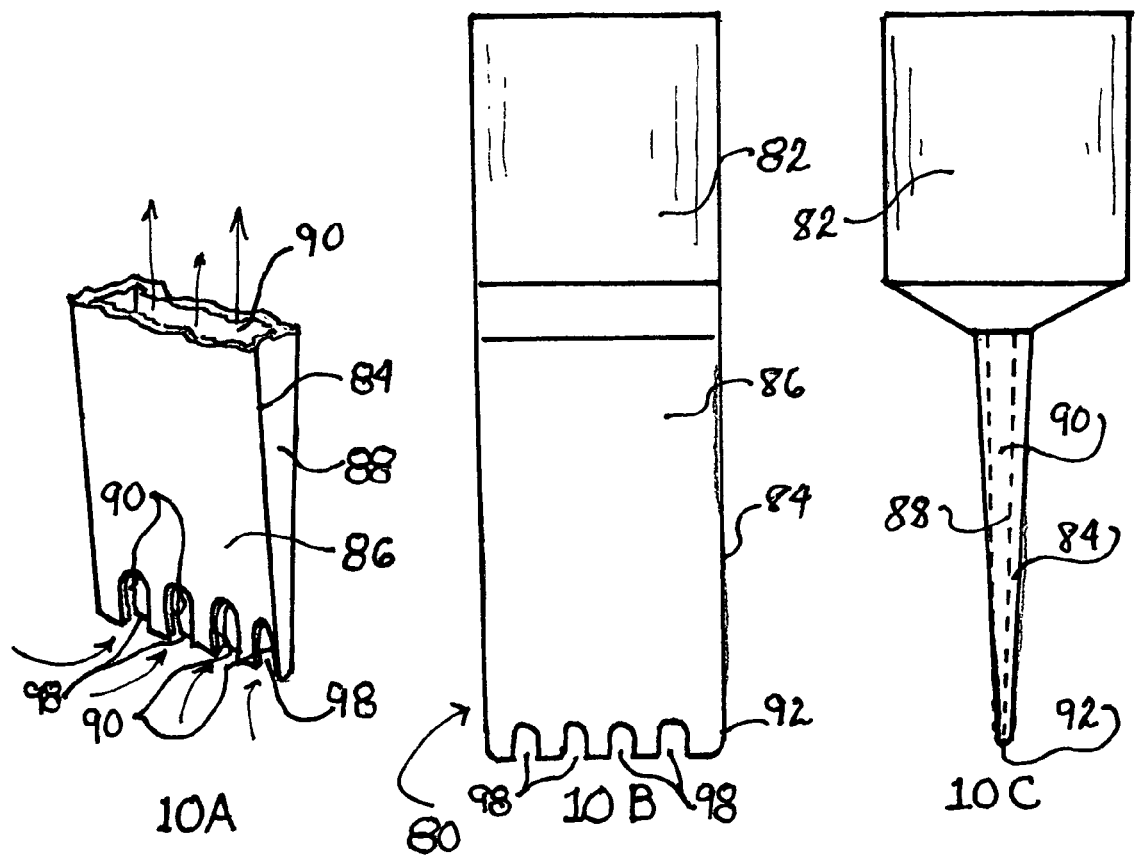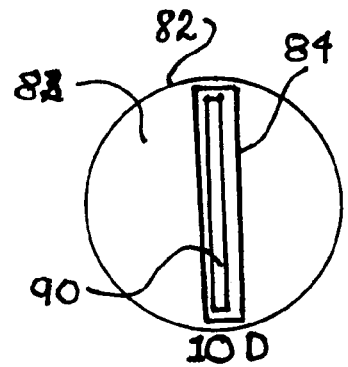
FIGURE 10

100 - KNURLED HEAD THUMB SCREW
104 - NUT FOR THUMB SCREW
102 - CLAMP FLANGE

DUST COLLECTOR COLLAR FOR ROTOZIP® TOOLS

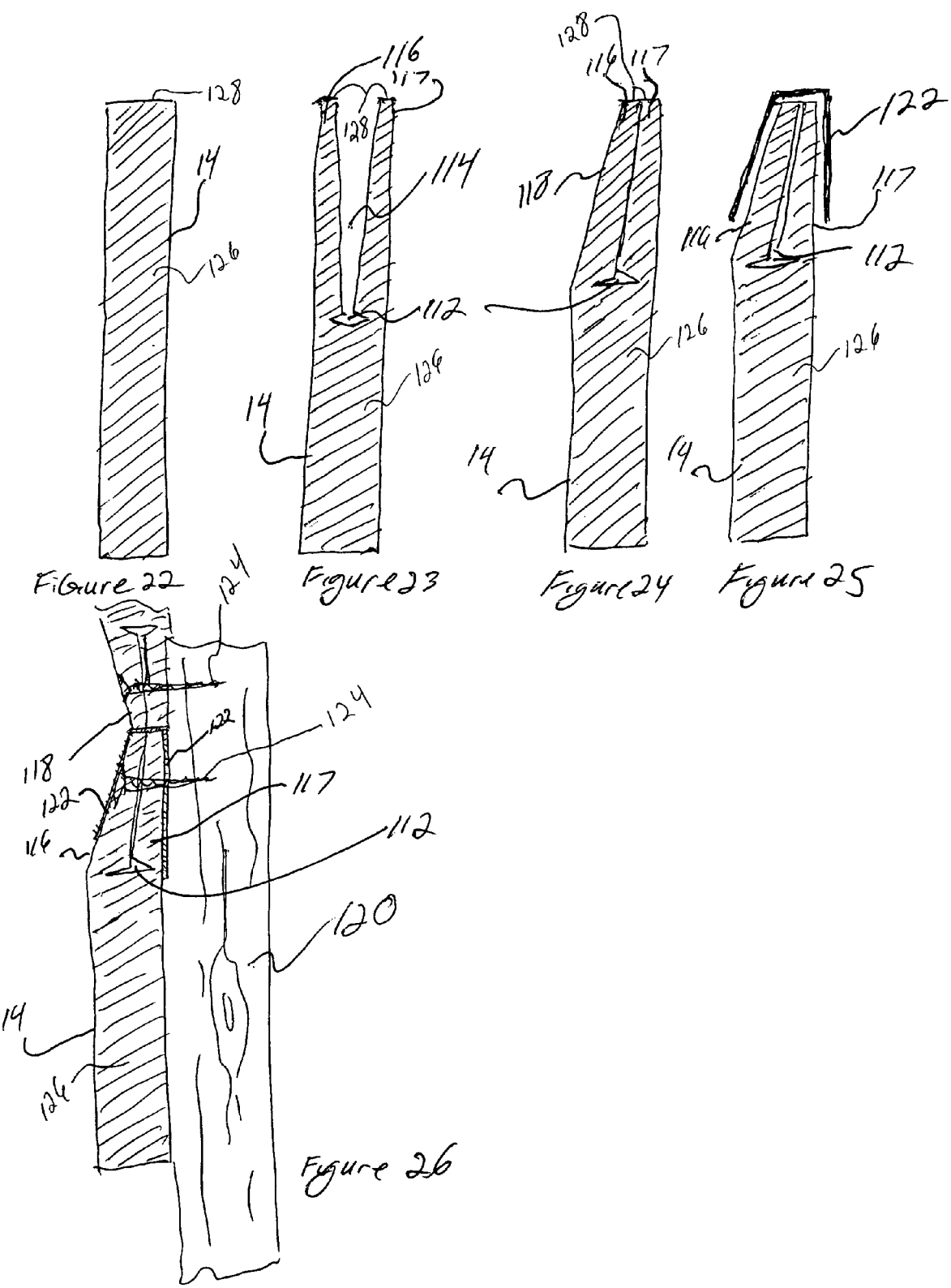

TAPERING DEVICE FOR REMOVING PORTIONS OF A GYPSUM BOARD

This is a Continuation-In-Part Application of U.S. application Ser. No. 10/935,327 filed on Sep. 7, 2004 now abandoned.

BACKGROUND OF THE INVENTION

1. Field of the Invention

The present invention relates generally to tapering devices and, more particularly, to tapering devices for removing portions of gypsum from edge portions of a non-tapered end of a gypsum board thereby configuring opposing protuberances with a recess therebetween to allow the protuberances to be forcibly joined together to form a tapered end when the gypsum board is secured to a support structure.

2. Background of the Prior Art

Gypsum board is commonly used to provide a finished wall surface for interior rooms of a house, office building or similar structure. Upon securing the gypsum board to wall studs, the resulting joints are taped, covered with a joint compound, then smoothed and finished so as to be undetectable after a coat of paint has been applied. Typically, the gypsum board includes a tapered edge portion that extends along the longitudinal sides of the board. The tapered edge portions of adjacent gypsum boards form a relatively shallow "V" shaped configuration that promotes a smooth undetectable seam after adding tape and finishing compound.

A problem arises when gypsum boards are cut and secured to a support structure such that non-tapered "butt" edges are adjacently positioned. A relatively high degree of skill and considerable additional time are required to tape and apply joint compound to non-tapered joints. However, irrespective of the degree of care exercised when covering a non-tapered joint, a noticeable "hump" or "crown," will ultimately form on the seam. Further, when a gypsum board is cut, the remnant portion ordinarily will be discarded due to a lack of taper at the cut portion that would ultimately adjoin a tapered portion of an already installed gypsum board.

A need exists in the art for a device and/or method for forming a non-tapered end of a gypsum board into a tapered configuration whereby the gypsum board can be disposed adjacent to a tapered portion of an already installed gypsum board, whereupon, the adjacent tapered ends are taped and covered with joint compound, then sanded to a smooth planar surface thereby eliminating the hump or crown of the present method of installing gypsum boards.

SUMMARY OF THE INVENTION

It is an object of the present invention to provide a tapering device that allows a non-tapered end of a gypsum board to be formed into a tapered configuration thereby overcoming many of the disadvantages of the prior art.

A principal object of the present invention is to provide a tapering device that removes or cuts a predetermined quantity of gypsum from between paper walls of a gypsum board. A feature of the device is a tapered tool bit that is detachably secured to a rotary drive tool. An advantage of the device is that it configures a recess in the edge portion of the gypsum board that forms two protuberances such that upon forcibly joining the protuberances together on a support structure, the result is a tapered end portion having a predetermined cross-sectional configuration.

Another object of the present invention is to remove gypsum dust from the recess cut into the gypsum board. A feature of the device is a dust collection collar that is detachably joined to a drive end of the rotary drive tool. The dust collection collar includes a suction end that is secured to a suction hose of a vacuum system. Another feature is spiral channel formed in the tapered tool bit to lift gypsum dust from the recess. An advantage of the device is that the removal of gypsum dust from the recess promotes the forcible joining of the protuberances.

Still another object of the present invention is to position the drive tool-tool bit assembly upon the edge of the gypsum board. A feature of the device is a pair of opposing angle members that are detachably joined to the dust collection collar. An advantage of the device is that the tool bit is centered between the paper walls of the gypsum board thereby preventing the protuberances from breaking when forcibly joined together upon securing the gypsum board to a support structure.

Yet another object of the present invention is to provide a member that removes gypsum dust from the recess after the drive tool-tool bit assembly has been removed from the recess. A feature of the device is a dust vacuum attachment that removes gypsum dust from the narrowest portions of the freshly cut recess. An advantage of the device is that by removing gypsum dust from the narrowest of regions of the recess, the protuberances may be forcibly joined together without damage when the gypsum board is secured to a support structure.

Another object of the present invention is to provide a method that includes a tool bit member with a flared end portion. A feature of the method is an enlarged cavity at the bottom of a tapered recess formed in an end portion of a gypsum board, the tapered recess and enlarged cavity being formed by the tool bit being rotated and guided between outer walls of the end portion of the gypsum board. Another feature of the method is that the tool bit is "slid" across the end portion of the gypsum board such that the rotating tool bit is initially parallel to a side edge of the end portion thereby disposing the flared end portion distally from an end edge of the end portion. An advantage of the method is that the enlarged cavity is formed distally from the end edge of the end portion of the gypsum board, the enlarged cavity extending laterally across the end portion of the gypsum board a predetermined and parallel distance from the end edge. Another advantage of the method is that by sliding the tool bit laterally across the end portion, the flared end portion of the tool bit member does not form an enlarged "starter hole" from the end edge into the end portion to a depth equal to the length of the tool bit. An advantage of the enlarged cavity extending laterally across the end portion of the gypsum board without a starter hole is that the recess separated outer walls of the end portion readily bends to configure an uniform tapered end portion of the gypsum board, the tapered end beginning at the enlarged cavity and ending at the end edge of the board. Avoiding a starter hole reduces the possibility of the gypsum board initially bending somewhere along the longitudinal axis of the starter hole resulting in a non-uniform bending and inconsistent taper of the end portion of the gypsum board.

Briefly, the invention provides a device for removing portions of a gypsum board to allow non-tapered end portions of the board to be tapered upon installing the gypsum board comprising a rotary drive tool; a tool bit removably secured to said rotary drive tool, said rotary drive tool imparting rotary motion to said tool bit; means for guiding said rotating tool bit through an end portion of the gypsum board whereby a portion of gypsum is severed from the end portion without damage to opposing paper walls of the gypsum board; and means for removing the severed portion of gypsum from the gypsum board whereby a recess is configured that allows the end portion to become tapered when the end portion is secured to a support structure.

The invention further provides a method for tapering an end portion of a gypsum board, said method comprising the steps of providing a tool bit having a flared end portion; providing means for rotating said tool bit; guiding said rotating tool bit between outer walls of the gypsum board such that a predetermined portion of the gypsum board is removed thereby forming a recess across a predetermined end portion of the gypsum board, said recess having an enlarged inner portion that corresponds to the configuration of said flared end portion of said tool bit; and bending at least one outer wall of the gypsum board after removing the predetermined portion of the gypsum board whereby a tapered end portion of the gypsum board is formed.

Also, the invention provides a method for tapering gypsum board, said method comprising the steps of forming a recess between outer walls of a predetermined end portion of a gypsum board, said recess having a configuration that includes an enlarged cavity disposed across said end portion a predetermined distance from an end edge of said end portion of the gypsum board; and bending at least one of the outer walls of the gypsum board via said enlarged cavity whereby a tapered gypsum board is formed.

Further, the invention provides a method for tapering gypsum board end portions, said method comprising the steps of:

providing a tool bit having an enlarged end portion;
providing means for rotating said tool bit;
guiding said rotating tool bit between outer walls of a gypsum board, said rotating tool bit initially engaging a side edge of the gypsum board and proceeding laterally through an end portion of the gypsum board until exiting the gypsum board via an opposite side edge whereby a recess with an enlarged inner cavity is formed; and
bending at least one recess forming outer wall of the end portion of the gypsum board via said enlarged cavity whereby the end portion of the gypsum board becomes tapered to facilitate a planar seam upon the application of tape and joint compound to adjacent tapered end portions of adjacent gypsum boards.

BRIEF DESCRIPTION OF THE DRAWINGS

The foregoing invention and its advantages may be readily appreciated from the following detailed description of the preferred embodiment, when read in conjunction with the accompanying drawings in which:

FIG. 6 is a sectional side view of a typical gypsum board.

FIG. 6A is a sectional side view of a gypsum board with a recess cut and cleaned by the present invention.

FIG. 6B is a sectional side view of a gypsum board with an alternative recess cut and cleaned by the present invention.

FIG. 6C is a sectional side view of a gypsum board with another alternative recess cut and cleaned by the present invention.

FIG. 7 is a sectional side view of two adjacently disposed gypsum boards with recesses therein, depicted in a tapered configuration after being secured to a support structure.

FIG. 10A is perspective view of a dust vacuum attachment member in accordance with the present invention.

FIG. 10B is a front elevation view of the dust vacuum attachment member of FIG. 10A.

FIG. 10C is a side elevation view of the dust vacuum attachment member of FIG. 10A.

FIG. 10D is a top elevation view of the dust vacuum attachment member of FIG. 10A.

FIG. 19 is a front elevation view of the tip portion of FIG. 18.

FIG. 20 is a side elevation view of the tip portion of FIG. 19.

FIG. 21 is a rotated front elevation view (¾ view) of the tip portion of FIG. 19.

FIG. 22 is a side elevation view of a typical gypsum board.

FIG. 23 is a side elevation view of the gypsum board of FIG. 22 after cutting the board with the flared bit of FIG. 18.

FIG. 24 is a side elevation view of the cut gypsum board of FIG. 23 after bending at least one of the outer walls of the gypsum board to form a tapered end in accordance with the present invention.

FIG. 25 is a side elevation view of the cut gypsum board of FIG. 24 after disposing tape upon opposing end portions of the outer walls of the gypsum board.

FIG. 26 is a side elevation view of two pieces of gypsum board adjacently disposed with each having a cooperating tapered end portion to ultimately receive plaster thereupon to cover the nailed portions of the gypsum board in accordance with the present invention.

DESCRIPTION OF THE PREFERRED EMBODIMENT

Figure 1:
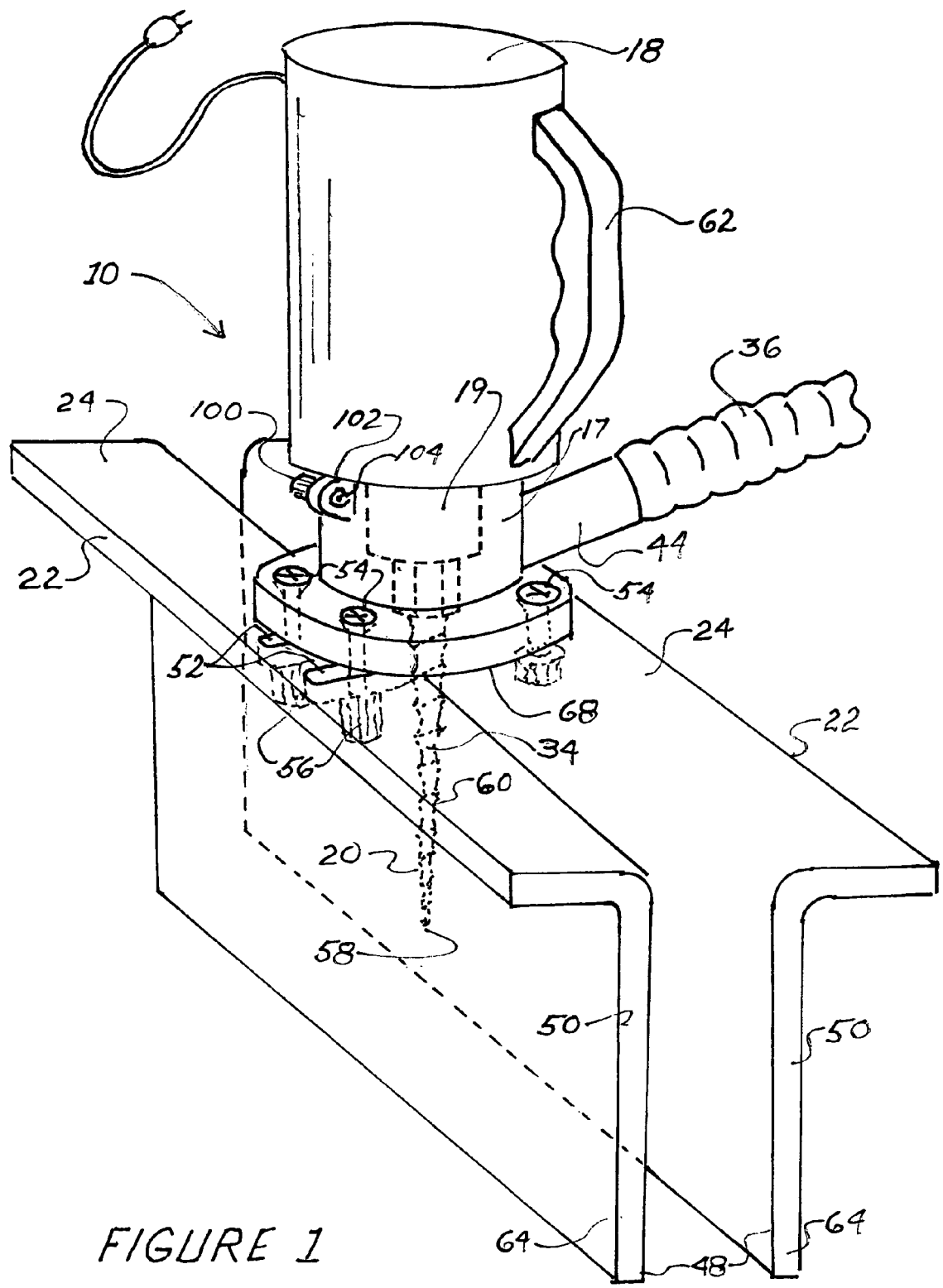
FIG. 1 is a perspective view of a tapering device for removing portions of a gypsum board to allow non-tapered end portions of the board to be tapered upon installing the gypsum board in accordance with the present invention.
Figure 2:
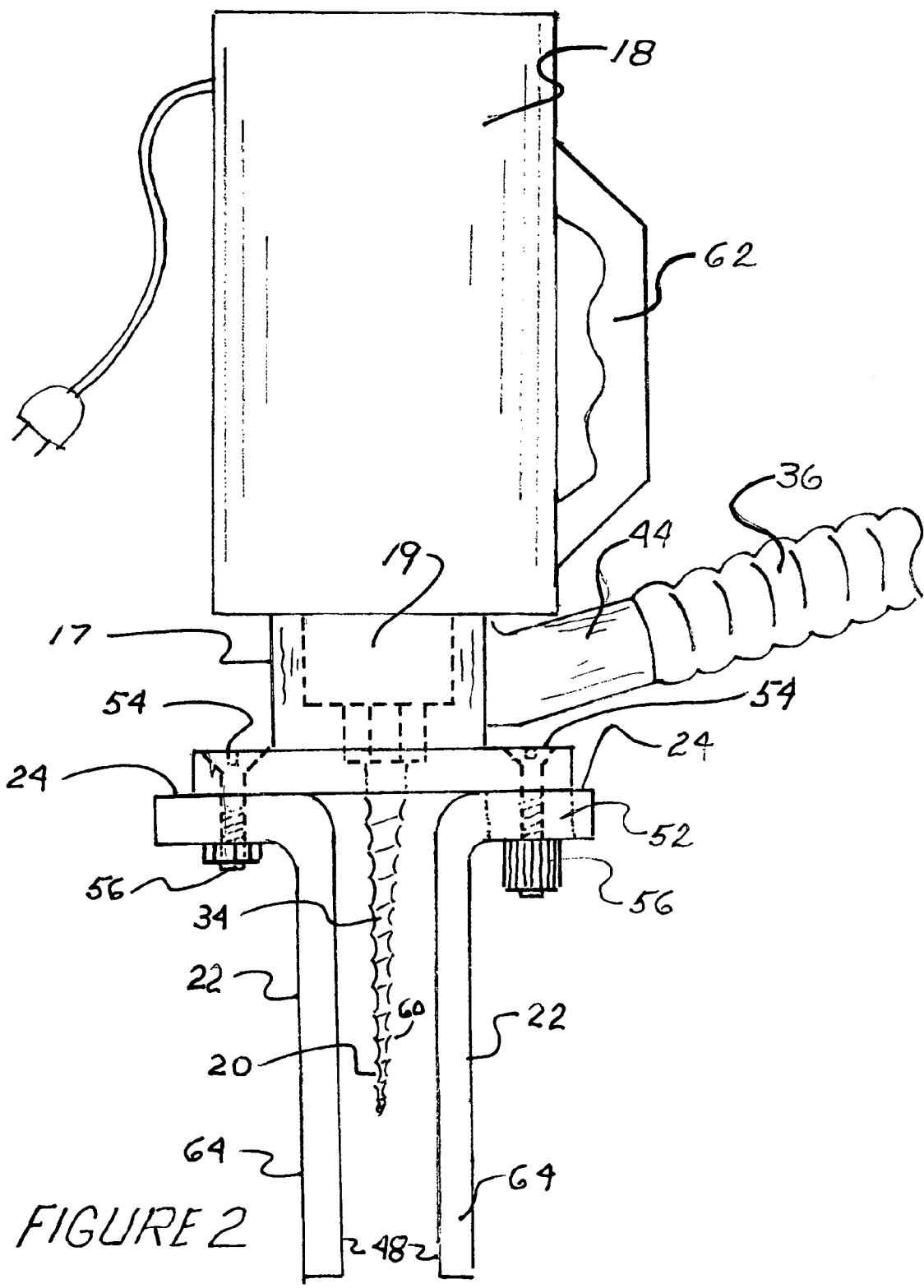
FIG. 2 is a side elevation view of the tapering device of FIG. 1.
Figure 3:
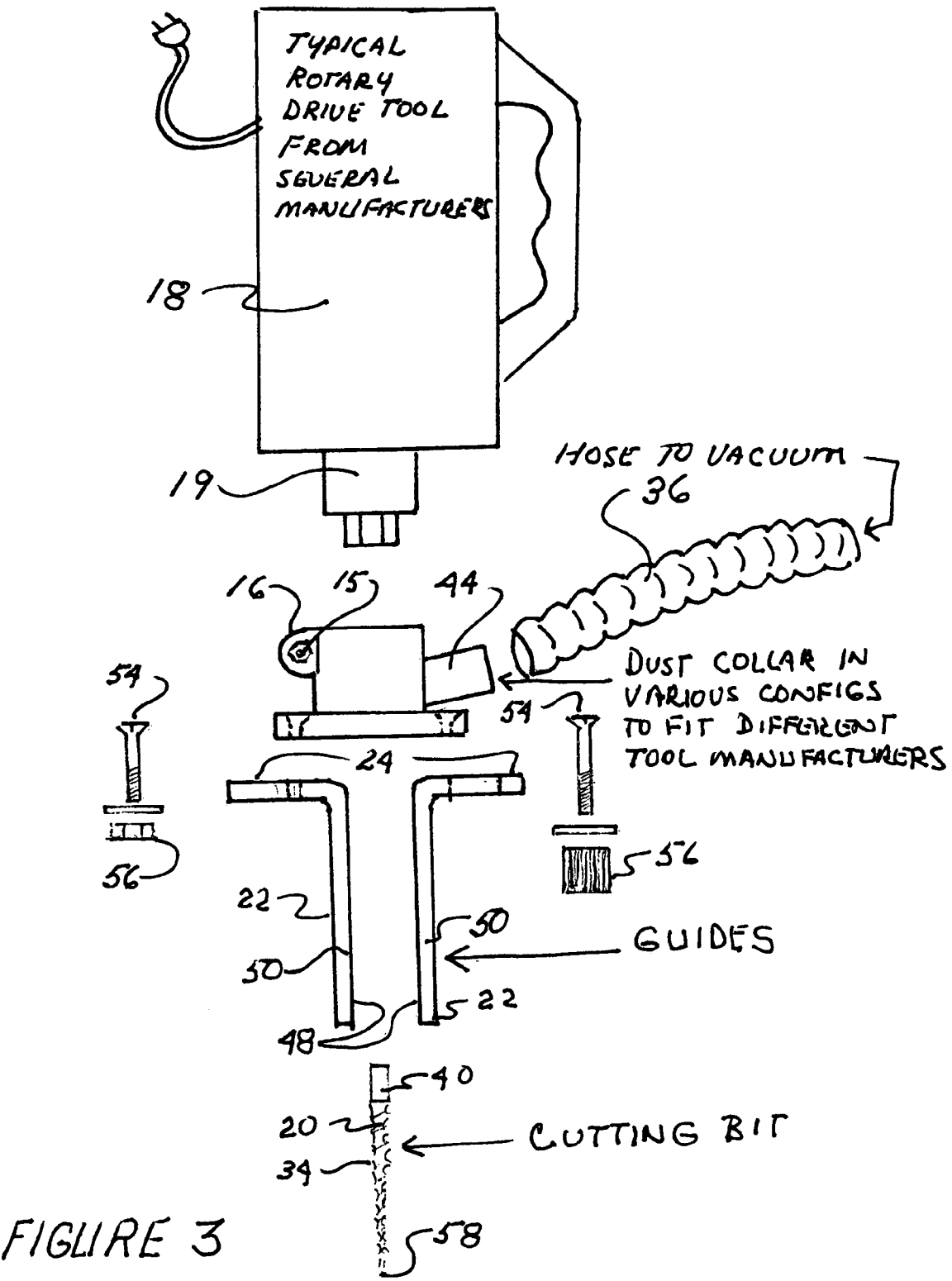
FIG. 3 is an exploded side view of the tapering device of FIG. 1.
Figure 4:
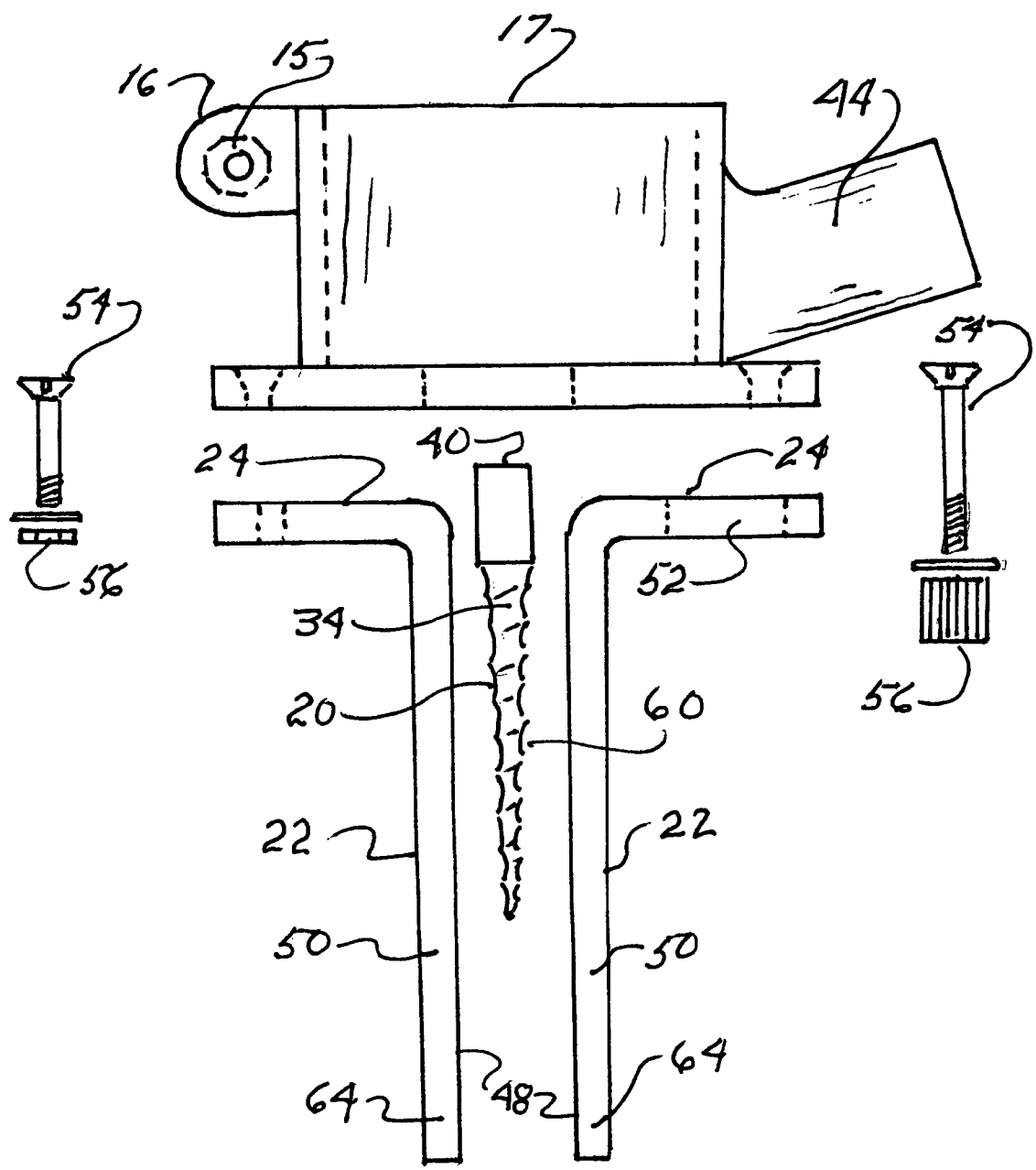
FIG. 4 is an exploded side view of the dust collection collar, angle members and tool bit of FIG. 3.
Figure 5:
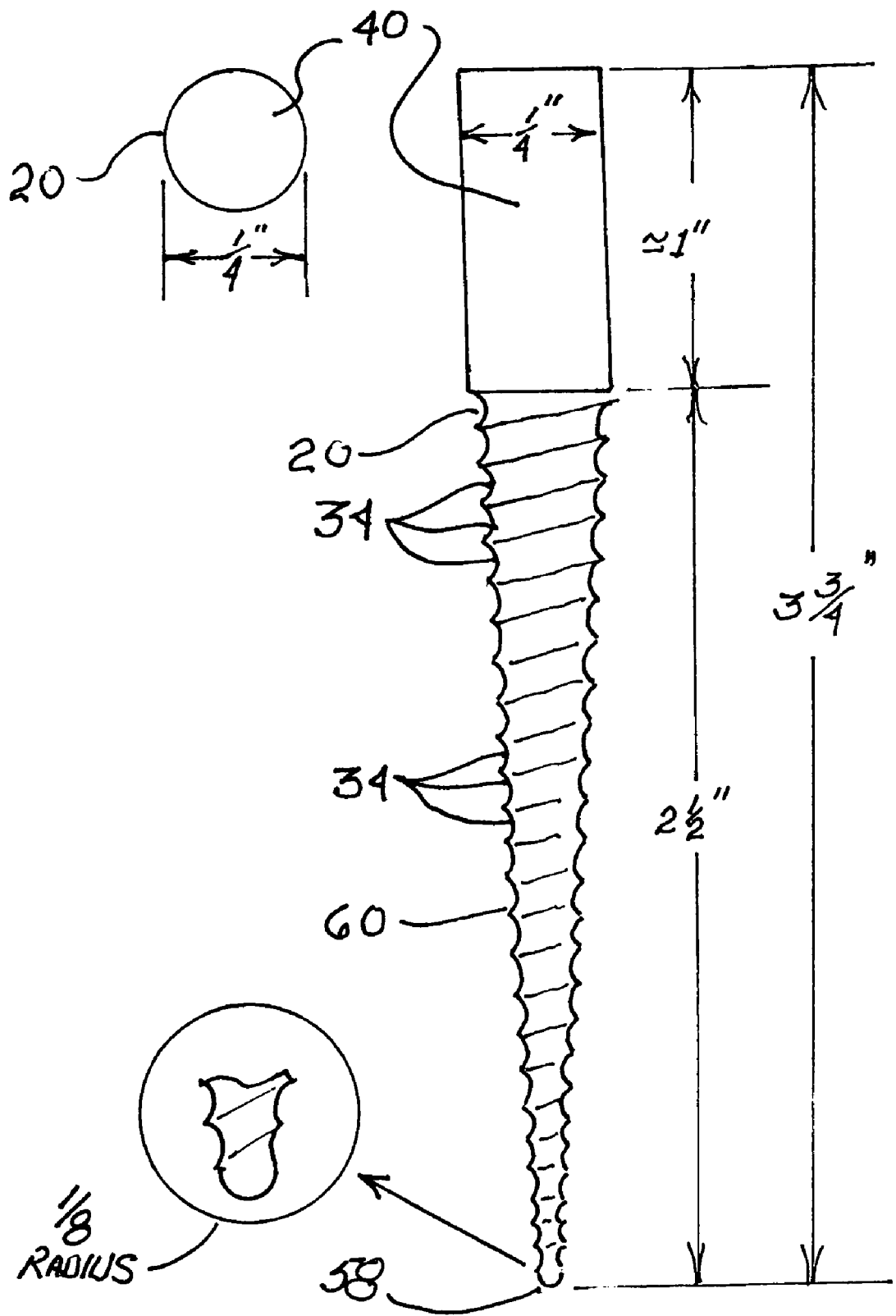
FIG. 5 is side elevation view of the tool bit of FIG. 4.
Figure 8:
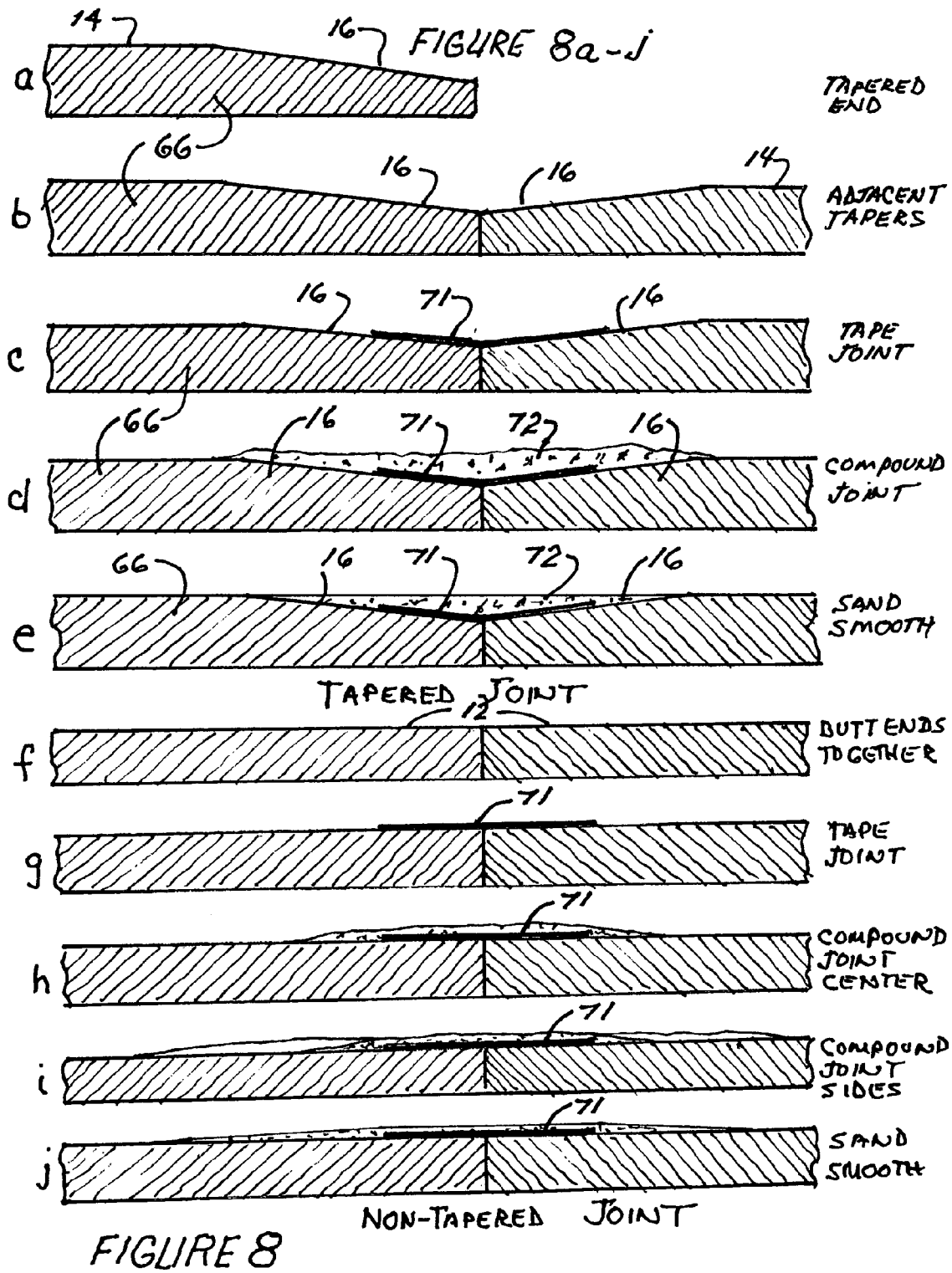
FIG. 8A is a sectional side view of a tapered end portion for a typical gypsum board.
FIG. 8B is a sectional side view of tapered end portions of two adjacently disposed gypsum boards.
FIG. 8C is the sectional side view of FIG. 8B but with joint tape covering the engaging portions of the gypsum boards.
FIG. 8D is the sectional side view of FIG. 8C but with joint compound covering the tapered portions of the gypsum boards.
FIG. 8E is the sectional side view of FIG. 8D but with the joint compound smoothed and finished.
FIG. 8F is a sectional side view of non-tapered end portions of two adjacently disposed gypsum boards.
FIG. 8G is the sectional side view of FIG. 8F but with joint tape covering the engaging portions of the gypsum boards.
FIG. 8H is the sectional side view of FIG. 8G but with joint compound covering the taped portions of the gypsum boards.
FIG. 8I is the sectional side view of FIG. 8H but with the joint compound spread thinly upon the taped portions and adjacent surfaces of the gypsum boards.
FIG. 8J is the sectional side view of FIG. 8I but with the joint compound smooth and forming a convex configuration relative to the surface of the gypsum boards.
Figure 9:
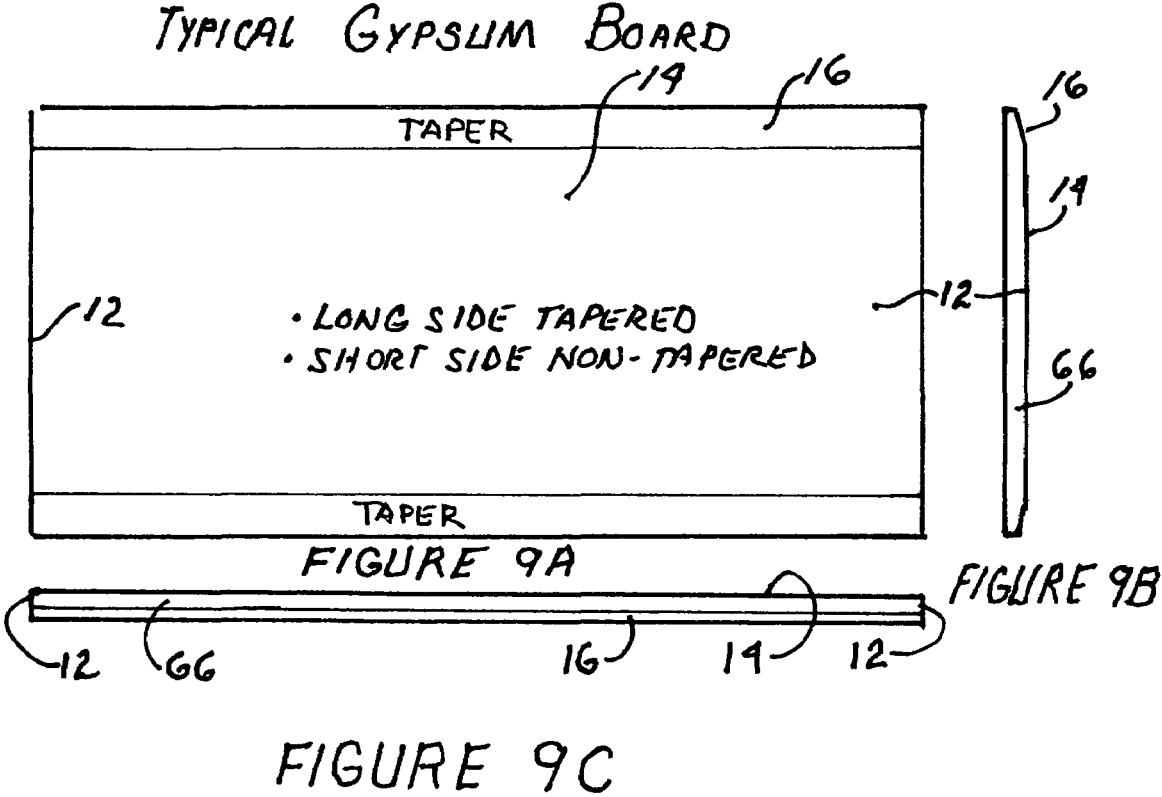
FIG. 9A is a top elevation view of a typical gypsum board having tapered longitudinal side portions.
FIG. 9B is a lateral side elevation view of the gypsum board of FIG. 9A.
FIG. 9C is a longitudinal side elevation view of the gypsum board of FIG. 9A.
Figure 11:
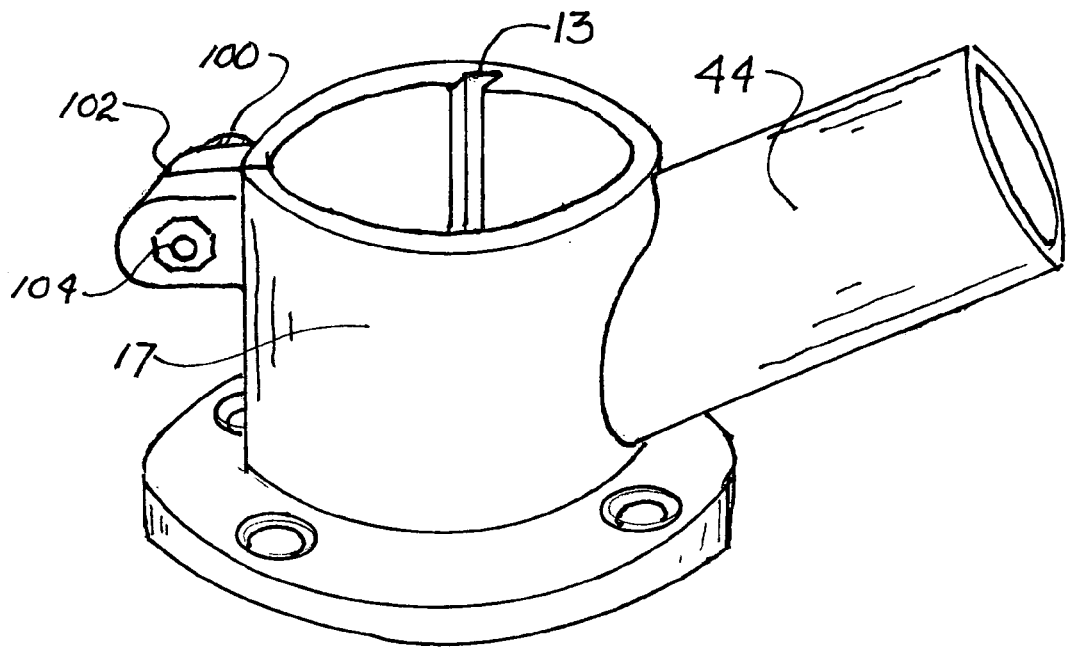
FIG. 11 is a perspective view of a dust collection collar in accordance with the present invention.
Figure 12:
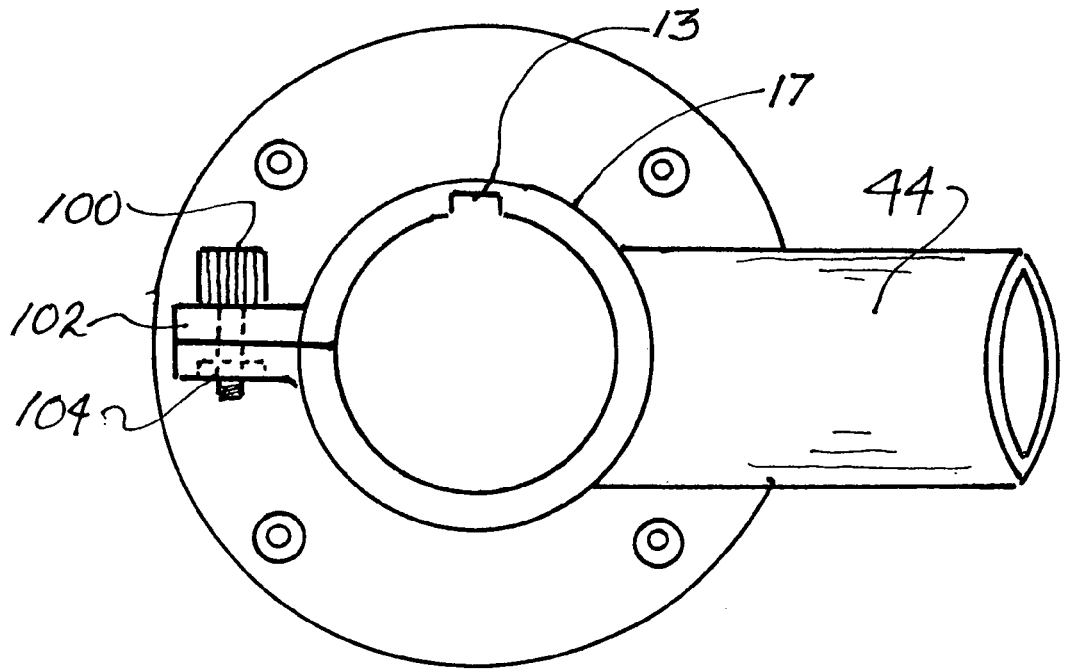
FIG. 12 is a top elevation view of the dust collection collar of FIG. 11.
Figure 13:
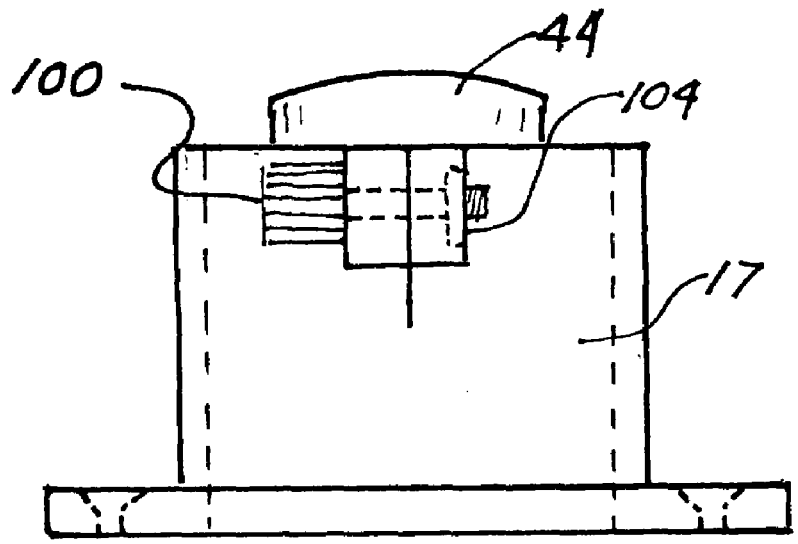
FIG. 13 is a left side elevation view of the dust collection collar of FIG. 11.
Figure 14:
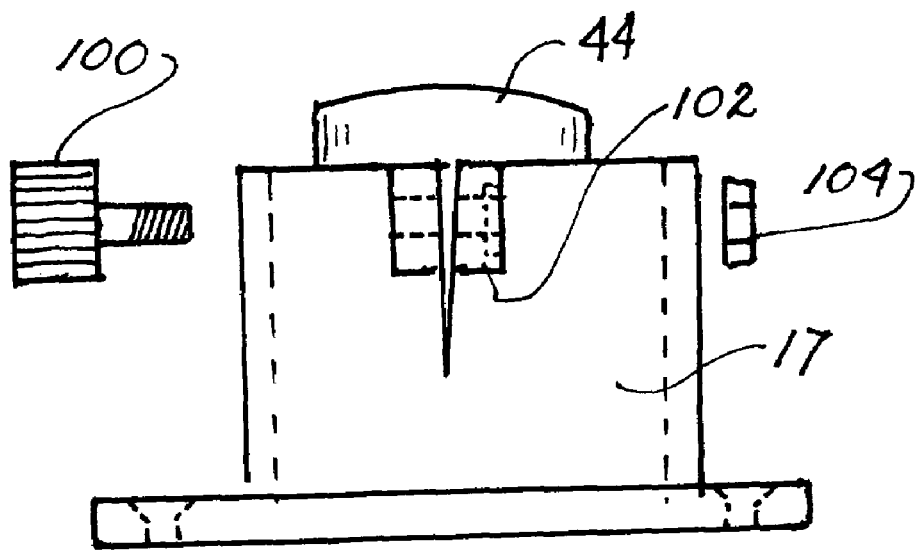
FIG. 14 an exploded left side elevation view of the dust collection collar of FIG. 13.

Referring now to the drawings and in particular to FIGS. 1–9, a tapering device 10 that allows a non-tapered end 12 of a plaster board, drywall or gypsum board 14 to be formed into a tapered configuration 16, includes a rotary drive tool 18 that imparts rotary motion to a gypsum cutting tool bit 20 that is removably secured to the rotary drive tool 18, a pair of oppositely disposed angle members 22 having cooperating base portions 24 attached to a dust collection collar 17. The dust collection collar 17 is fabricated from plastic or similar rigid, deformable material, and is configured to be detachably joined to a drive end 19 of the rotary drive tool 18. The angle members 22 dispose and guide the rotating tool bit 20 between outer paper walls 28 of the non-tapered end 12 of the gypsum board 14 to ultimately sever portions of gypsum from the non-tapered end 12 thereby forming a recess 32 without damaging the paper walls 28. The tool bit 20 removes the severed portions of gypsum from the recess 32 via a spiral channel 34 circumferentially disposed about the tool bit 20. A vacuum system 36 removes the severed portions of gypsum from the gypsum board 14 when the tool bit "lifts" the severed portions from the recess 32. The non-tapered end 12 is then forcibly bent to form a tapered configuration 16 upon the securing of the non-tapered end 12 to a support structure 38.

The rotary drive tool 18 is a typical, commercially available hand held power tool similar to the power tools sold by Roto Zip Tool Corporation located at 1861 Ludden Drive, Cross Plains, Wis. The rotary drive tool 18 includes a collet that snugly grasps and holds a hexagonally configured drive end 40 of the gypsum cutting tool bit 20. The gypsum cutting tool bit 20 is fabricated from a standard high speed, one-quarter inch diameter, carbon steel drill bit by utilizing manufacturing methods well known to those of ordinary skill in the art. One method includes disposing the standard drill bit on a CNC or End Mill Puller machine, whereupon, the machine removes metal stock from the periphery 60 of the tool bit to form the required tapered configuration for the resulting gypsum cutting bit 20, then deepens the flutes or spiral channel 34 in the drill bit over the length of the drill bit to a position proximate to a relatively pointed end 58 such that the end 58 maintains structural integrity while promoting the removal of gypsum when cutting the recess 32 into the gypsum board 14.

The standard drill bit is tapered to replicate the industry standard for tapering end portions of gypsum board. More specifically, a typical gypsum board 14, irrespective of thickness, includes an end portion 16 having a two and one-half inch lateral dimension that is tapered one-eighth of an inch for the entire two and one-half inches (see FIGS. 9A–9C). Thus, the gypsum cutting bit 20 must have a cutting portion of at least two and one-half inches in axial length with a taper of one-eighth of an inch over that same two and one-half inches of axial length. Obviously, should the gypsum board 14 taper dimensions vary, the taper dimensions of the bit 20 will correspondingly vary. Also, the configuration of the bit 20 and the resulting recess 32 may vary (as detailed in FIGS. 6A–6C) to provide a required taper for boards 14 of varying thickness.

After tapering the tool bit 20, the spiral channels 34 will be machined to a depth of substantially about one-twelfth of an inch to promote the removal of the gypsum dust from the recess 32 by the bit 20 rotating in a cooperative direction. Further, the deeper channels 34 allow the corresponding periphery of the bit 20 to cut the gypsum board to configure the required recess 32 in the non-tapered end 12. The channels 34 will not be modified near the end 58 of the bit 20 to maintain structural integrity, however, due to insufficient channel depth, the bit 20 will not be able to remove gypsum dust in the narrow portions of the recess 32 formed by the end 58 of the bit 20. The tapered tool bit 20 with the deeper channels 34 is suitable for total immersion into the gypsum board and/or gypsum dust, a feature that standard drill bits do not possess.

Referring now to FIGS. 11–14, the dust collector 17 slides over the drive end 19 of the rotary drive tool 18 such that a key guide slot 13 is aligned with a key on the drive end 19 of the drive tool 18. A threaded shaft 100 is fed through a clamp flange 102 into a lock nut 104, whereupon, the shaft 100 is tightened into the lock nut 104 thereby securing the dust collection collar 17 onto the drive end 19 of the rotary drive tool 18. The collector 17 is configured and dimensioned to promote the collection of cut gypsum dust removed from the recess 32 by the tool bit 20, and to direct the discharge of the dust through a suction end 44 and into a hose member 36 of a vacuum system.

After joining the dust collection collar 17 to the drive end 19 of the drive tool 18, the hose member 36 is removably secured to the suction end 44 of the collection collar 17. An opposing end of the hose member 36 is secured to a typical suction member (not shown) of any vacuum system utilizing a standard industrial vacuum hose. The suction end is disposed to promote the removal of severed portions of gypsum from the gypsum board 14, as the severed portions are removed from the recess 32 by the tool bit 20. The angle members 22 are configured to facilitate the securing of the angle members 22 irrespective of the distance separating inner walls 48 of board engagement portions 50 of the angle members 22. The position of the each angle member 22 is adjusted via slots 52 disposed through the base portion 24. The dust collection collar 17 is ultimately secured to the base portions 24 via securing bolts 54 inserted through the slots 52 and nuts 56 snugly tightened upon the bolts 54.

The angle members 22 are fabricated from rigid, light weight material suitable to maintain alignment with the centered tool bit 20, and sufficiently durable to tolerate the weight and vibrations generated by the rotary drive tool 18 and the tool bit 20 secured thereto. The angle members 22 are configured to provide the base portion 24 with a lateral dimension that cooperatively accepts a predetermined longitudinal dimension of the slots 52. The angle member 22 configuration also provides the board engagement portions 50 with a longitudinal dimension, when taking a side view (FIG. 2), that extends the angle member 22 beyond a relatively pointed cutting end 58 of the tool bit 20, and with an inner wall 48 surface area that promotes stability when the inner walls 48 snugly engage the outer paper walls 28 of the gypsum board 14 after the angle members 22 have been adjustably secured to the dust collection collar 17 to facilitate the cutting of the recess 32 in the non-tapered end 12 of the gypsum board 14.

The tool bit 20 is fabricated from steel or similar hard metal that enables the pointed cutting end 58 or side periphery 60 to cut gypsum. The tool bit 20 tapers from the hexagonal drive end 40 to the pointed or small radius cutting end 58 that penetrates the plaster between the outer paper walls 28. The taper of the tool bit 20 is such that the outer diameter of the drive end 40 is relatively larger than the outer diameter near the cutting end 58 thereby promoting a corresponding "sharp" taper to the gypsum board 14 that is identical to the manufactured taper of the gypsum board 14 when the board 14 is nailed, screwed or otherwise secured to the support structure 38 which is typically wood or lightweight steel. The circumferentially disposed spiral channel 34 in the tool bit 20 is configured to extract, when rotating, portions of gypsum and dust from the recess 32. The portions of gypsum and dust resulting from the tool bit 20 engaging gypsum between the outer paper walls 28 when cutting the recess 32 into the non-tapered end 12 of the gypsum board 14.

In operation, an individual selects a gypsum board 14 having a non-tapered end 12 that will ultimately abut a gypsum board 14 with a tapered configuration 16 that is secured upon a support structure 38. To promote a shallow "V" configured surface along the junction of the two boards 14, the non-tapered end 12 must be modified to include a recess 32 that allows the non-tapered end 12 to become tapered when the non-tapered end 12 is secured to the support structure 38. The recess 32 is formed by the individual holding the rotary drive tool by a handle 62 with the securing bolts and nuts 54 and 56 loosened to allow a bottom portion 64 of the angle members 22 to slide upon the outer paper walls 28 of the gypsum board 14 until the tip 58 of the tool bit 20 is disposed adjacent to the gypsum 66 and equidistant (for a one-half inch thick gypsum board 14) between the outer paper walls 28. The bolts 54 are then tightened to lock the position of the angle members 22. The rotary drive tool 18 is energized to rotate the tool bit 20, whereupon the tool bit 20 is forcibly inserted into the solid gypsum 66 by the individual until a bottom wall 68 of the dust collection collar 17 is disposed proximate to the gypsum 66.

Figures 15, 16, 17:
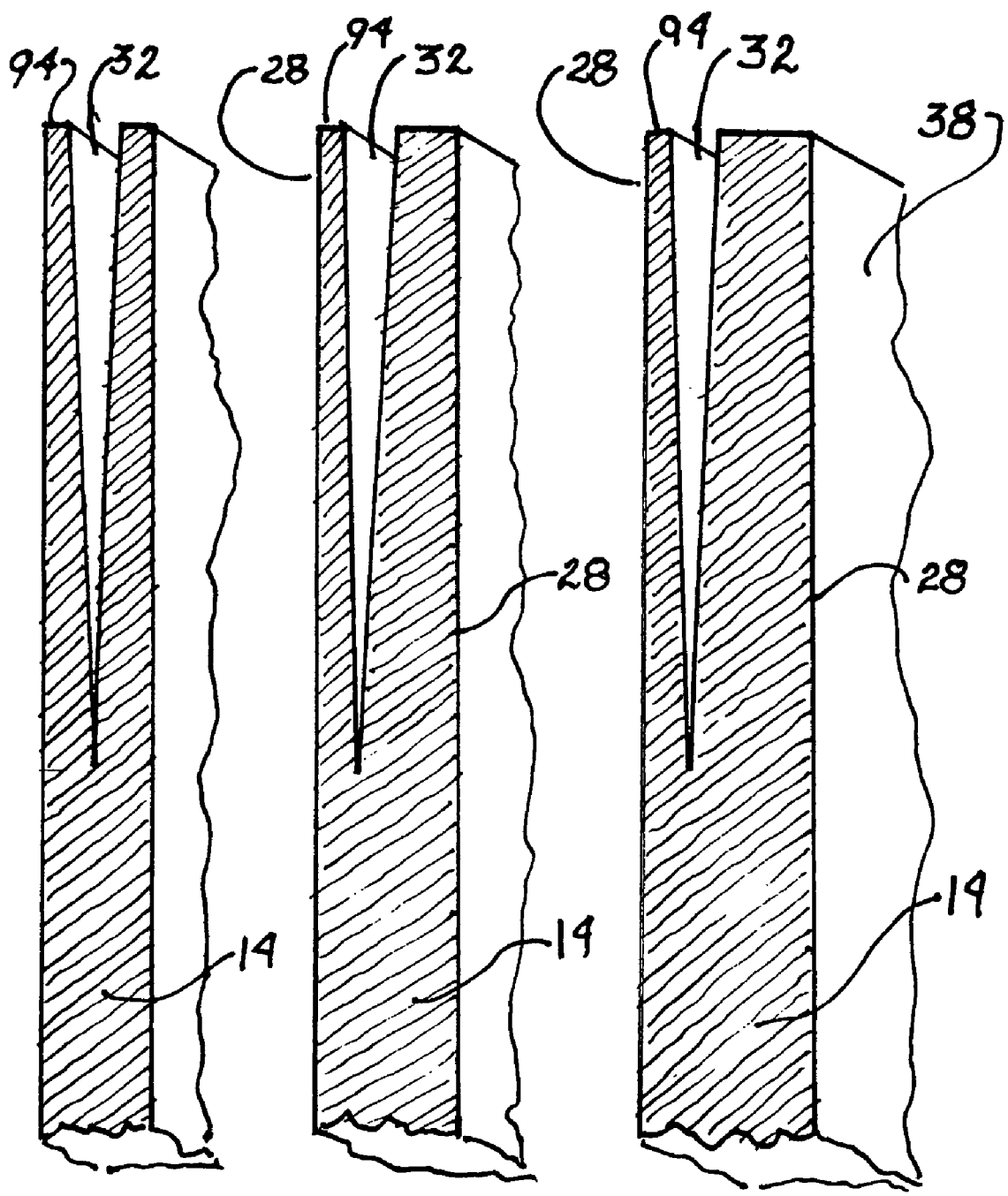
FIG. 15 is a sectional side view of a standard one-half inch thick gypsum board.
FIG. 16 is a sectional side view of a standard five-eighths inch thick gypsum board.
FIG. 17 is a sectional side view of a standard three-quarter inch thick gypsum board.

The recess 32 cut in a one-half inch thick (or thinner) gypsum board 14 is disposed at a proximate mid-portion of the board 14 (see FIG. 15). For five-eighths or three-quarter inch thick boards 14 (see FIGS. 16 and 17, respectively), the recess 32 would be disposed closer to the outer wall 28 that will be ultimately "bent" to form the tapered portion of the board 14 when the board 14 is secured to a support structure 38. The corresponding protuberances 94 are difficult to bend for the thicker boards 14 (FIGS. 16 and 17) should the recess 32 be disposed equidistant between the outer walls 28. Therefore, the thickness of the bendable protuberance 94 is the same for each of the boards 14 irrespective of thickness.

Obviously, the thicker the board 14, the greater the distance between the recess 32 and the side wall 28 engaging the support structure 38.

The angle members 22 are then forcibly slid upon the outer paper walls 28 while the tool bit channel 34 rotates and cuts through the gypsum 66 and at the same time, removes the resulting gypsum dust to ultimately form the recess 32. After the recess 32 has been formed through the entire non-tapered end 12 of the gypsum board 14, the board 14 is secured upon the support structure 38 via nails 70, screws or similar securing means. As the non-tapered end 12 is secured in position by the securing means, the non-tapered end 12 starts to collapse thereby forming an angle or taper. After the plaster board 14 has been tightly secured to the support structure 38, the non-tapered end 12 has totally collapsed to form a tapered configuration 16 that cooperates with an abutting adjacent tapered gypsum board 14 to receive tape 71 and plaster 72 upon adjoining outer paper walls 28 to ultimately provide a smooth, planar surface that is undetectable after the entire surface of the gypsum boards 14 is painted.

Referring now to FIGS. 10A–D, a dust vacuum attachment member 80 is depicted. The member 80 is sized to fit snugly into the recess 32 and is used to remove gypsum dust that collects in narrow portions of the recess 32 after the tool bit 20 has been removed from the recess 32. The dust that collects in the narrow portions of the recess 32 is generally not removed by the tool bit 20. More specifically, the spiral channels 34 in the tool bit 20 rotate to remove or "lift" the dust from the recess 32 up to the dust collection collar 17 whereupon the vacuum system removes the dust via the suction end 44 of the collar 17. The relatively shallow depth of the spiral channel 34 at the point 58 of the tool bit 20 inhibits physically moving the dust thus preventing the dust from being lifted from the narrow portions of the recess 32.

The member 80 is made from plastic or similar rigid material, and includes a cylindrical hose portion 82 with a cavity 83 therein that snugly inserts into and is removably secured to the suction hose 36 of a vacuum system. Besides the hose portion 82, the member 80 includes an elongated recess portion 84 having a front wall 86 with relatively large longitudinal and lateral dimensions, a substantially "V" configured side wall 88 with a relatively small lateral dimension in comparison to the front wall 86, and an aperture 90 extending longitudinally through the recess portion 84. The configuration of the recess portion 84 disposes a suction end 92 adjacent to the narrow bottom 93 of the recess 32 to promote the removal of gypsum dust. Removing gypsum dust, prevents breakage or other damage to two opposing protuberances 94 that are forcibly urged together when securing the gypsum board 14 to a support structure 38 thereby providing a tapered configuration 16. The protuberances 94 result from the cutting of the recess 32 into an edge portion 96 of the gypsum board 14 (see FIGS. 6 and 6A–6C).

The suction end 92 includes a series of notches or apertures 98 that promote the insertion of the suction end 92 into a relatively large amount of gypsum dust that has accumulated in the recess 32 during the cutting of the recess 32 into the edge portion 96 of the gypsum board 14. The notches 98 increase the surface area of the suction end 92 to reduce the amount of time required to remove all the gypsum dust from the recess 32 after energizing the vacuum system.

Figure 18:
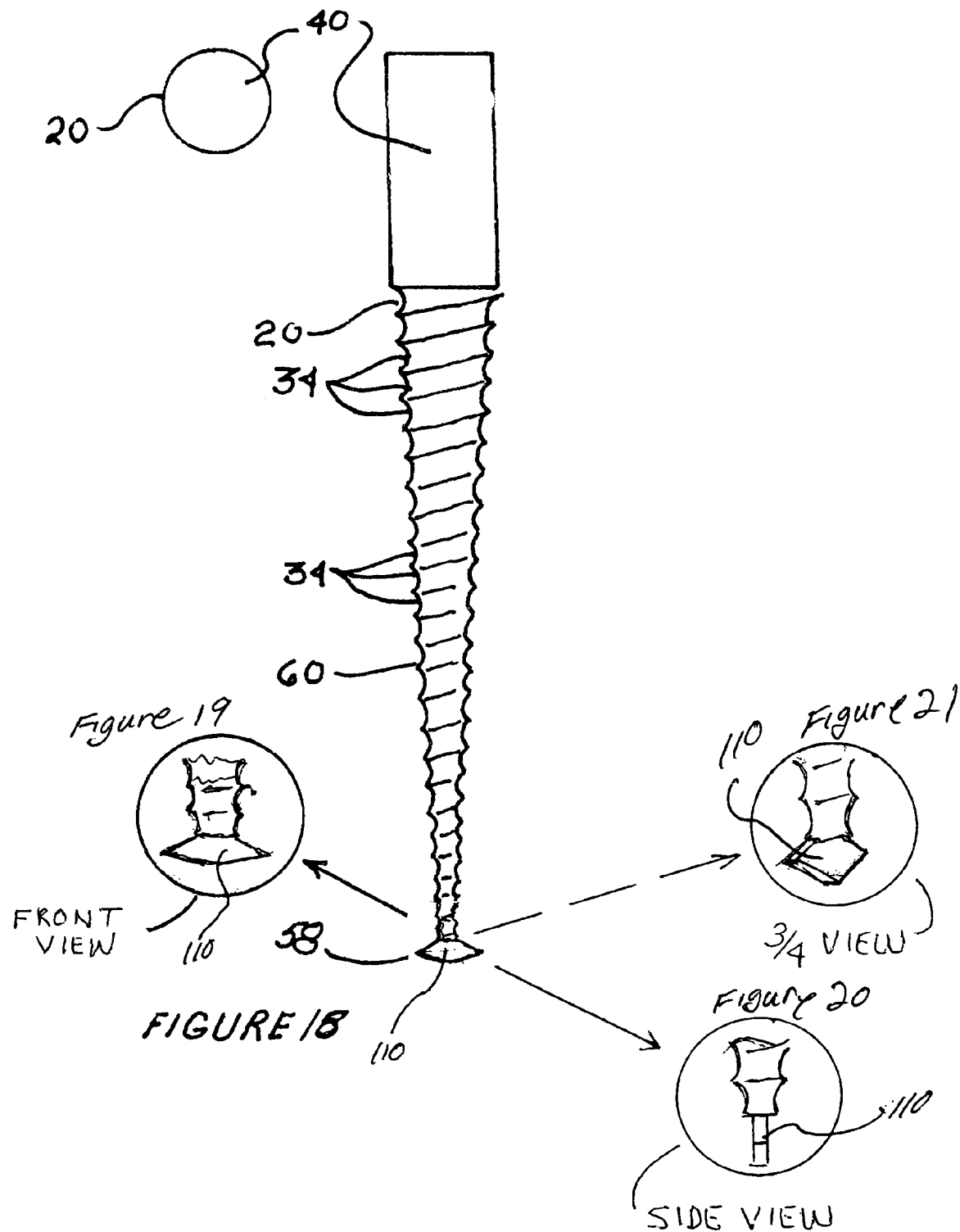
FIG. 18 is a front elevation view of an alternative (flared) bit design with an enlarged tip portion in accordance with the present invention.

Referring now to FIGS. 18–26, an alternative device and method for tapering an end portion of a gypsum board 14 in accordance with the present invention is depicted. FIG. 18 depicts the tool bit 20 of FIG. 5, but with a flared end or end portion 110. The flared end 110 forms a corresponding enlarged cavity 112 at the bottom or inner portion of the tapered recess 114 formed by the tool bit 20. The placement of the cavity 112 corresponds to the bend or "snap" portion of the gypsum board 14 where the installer forcibly bends one of the outer walls 116 of the recess 114 at the end of the gypsum board 14 to form a tapered end portion 118. Although both outer walls 116 and 117 could be bent to taper the end portion 118, the preferred method is to bend only one outer wall 116 because the opposing outer wall 117 must remain planar to facilitate contact with a support structure 120 to allow a plurality of fasteners 124 to secure the gypsum board 14 to the support structure 120, typically a "two-by-four."

The enlarged cavity and tapered recess 112 and 114 are formed by the tool bit being rotated and guided between the outer walls 116 and 117 of the end portion 118 of the gypsum board 14. The tool bit 20 is ultimately "slid" across the end portion 118 of the gypsum board 14 such that the rotating tool bit 20 is initially parallel to a side edge 126 of the end portion 118 thereby disposing the flared end 110 distally from an end edge 128 of the end portion 118. The enlarged cavity 112 relieves pressure when bending the outer wall 116 toward the adjacent outer wall 117 thereby preventing the outer wall 116 from splitting or cracking along a line proximate to the bottom of the recess 114. The enlarged cavity 112 is formed distally from the end edge 128 of the end portion 118 of the gypsum board 14, the enlarged cavity 112 extending laterally across the end portion 118 of the gypsum board 14 a predetermined and parallel distance from the end edge 128. Sliding the tool bit 20 laterally across the end portion 118 via the side edges 126 such that the rotating tool bit 20 initially engages a first side edge 126 of the gypsum board 14 and proceeds laterally through the end portion 118 of the gypsum board 14 until exiting the end portion 118 via an opposite second side edge 126, prevents the flared end 110 of the tool bit 20 from boring a relatively large "starter hole" from the end edge 128 into the end portion 118 a depth equal to the length of the tool bit 20. Extending the enlarged cavity 112 laterally across the end portion 118 of the gypsum board 14 without including a starter hole, promotes the bending and tapering of the end portion 118 from the enlarged cavity 112 to the end edge 128 of the gypsum board 14 thereby configuring an uniform tapered end portion 118. Avoiding a starter hole, reduces the possibility of the gypsum board 14 initially bending somewhere along the longitudinal axis of the starter hole. Initially bending the end portion 118 at a location other than the enlarged cavity 112, would result in a non-uniform bending and inconsistent taper of the end portion 118 of the gypsum board 14 that could cause a humped or crowned seam when adjacent, inconsistent tapered end portions 118 of adjacent gypsum boards 14 are taped and covered with joint compound.

A myriad of tool bit end 110 configurations can be utilized when forming the enlarged cavity 112. The preferred configuration is a substantially flared or bell shaped design that includes a horizontal dimension (corresponding to the horizontal movement of outer wall 116 depicted in FIGS. 23–26) of substantially about one-half the thickness of the gypsum board. The vertical dimension of the cavity 112 need only be about one-half the horizontal dimension. The depth of the recess 114 corresponds to the axial length of the bit 20 which is generally between two and three inches.

To maintain the position of the outer wall 116 after being bent to a tapered position, a securing tape 122 is disposed at a plurality of locations upon end edges 128 of the outer walls 116 and 117 of all the tapered end portions 118 of the gypsum boards 14, thereby facilitating the fastening of the tapered end portion 118 of the gypsum board 14 onto the support structure 120.

The foregoing description is for purposes of illustration only and is not intended to limit the scope of protection accorded this invention. The scope of protection is to be measured by the following claims, which should be interpreted as broadly as the inventive contribution permits.

The invention claimed is:

1. A method for tapering an end portion of a gypsum board, said method comprising the steps of:
providing a modified drill bit having an enlarged end portion;
providing means for rotating said modified drill bit;
guiding said rotating modified drill bit between outer walls of the gypsum board such that a predetermined portion of the gypsum board is removed thereby forming a recess across a predetermined end portion of the gypsum board, said recess having an enlarged inner portion that corresponds to the configuration of said enlarged end portion of said modified drill bit; and
bending at least one outer wall of the gypsum board after removing the predetermined portion of the gypsum board whereby a tapered end portion of the gypsum board is formed.

2. The method of claim 1 wherein the step of providing a modified drill bit includes the step of providing a substantially bell or flared configured tip.

3. The method of claim 1 wherein the step of bending at least one of the outer walls of the gypsum board includes the step of securing together opposing end portions of the outer walls of the gypsum board.

4. The method of claim 3 wherein the step of securing opposing end portions of the outer wall of the gypsum board includes the step of taping together predetermined end portions of the outer walls forming said recess in said end portion of the gypsum board.

5. The method of claim 1 wherein the step of providing a modified drill bit includes the step of providing a tapered modified drill bit.

6. The method of claim 1 wherein the step of providing a modified drill bit includes the step of providing a channeled modified drill bit.

7. The method of claim 1 wherein the step of guiding said rotating modified drill bit includes the step of providing at least one angle member with a base portion configured to promote attaching a drive end of said rotating means to said base portion.

8. The method of claim 1 wherein the step of guiding said rotating modified drill bit includes the step of providing two oppositely disposed angle members with cooperating base portions configured to promote attaching a dust collection collar thereto.

9. The method of claim 1 wherein the step of guiding said rotating modified drill bit includes the step of providing means for removing severed portions of the gypsum board from said recess.

10. The method of claim 9 wherein the step of providing removing means includes the step of providing a vacuum system.

11. A method for tapering an end portion of a gypsum board, said method comprising the steps of:
providing a tool bit having an enlarged end portion;
providing means for rotating said tool bit;
guiding said rotating tool bit between outer walls of the gypsum board such that a predetermined portion of the gypsum board is removed thereby forming a recess across a predetermined end portion of the gypsum board, said recess having an enlarged inner portion that corresponds to the configuration of said enlarged end portion of said tool bit, the step of guiding said rotating tool bit including the step of providing two oppositely disposed angle members with cooperating base portions configured to promote attaching a dust collection collar thereto, the step of guiding said rotating tool bit including the step of providing means for adjusting the position of said angle members relative to said dust collection collar whereby the distance separating board engagement portions of said angle members is adjusted to correspond to the distance separating the paper walls of the gypsum board to allow the gypsum board to insert between said board engagement portions; and bending at least one outer wall of the gypsum board after removing the predetermined portion of the gypsum board whereby a tapered end portion of the gypsum board is formed.

12. The method of claim 11 wherein said board engagement portions include a longitudinal dimension, when taking a side elevation view of the angle members, relatively longer than the axial dimension of said tool bit.

13. A method for tapering gypsum board, said method comprising the steps of:

forming a recess between outer walls of a predetermined end portion of a gypsum board, said recess having a configuration that includes an enlarged inner cavity disposed across a corresponding bend portion of the gypsum board; and bending at least one of the outer walls of the gypsum board via said enlarged inner cavity whereby a gypsum board with a tapered end portion is formed.

14. The method of claim 13 wherein the step of forming a recess includes the step of providing a rotating modified drill bit.

15. The method of claim 14 wherein said modified drill bit includes an enlarged end portion.

16. The method of claim 15 wherein said enlarged end portion includes a substantially flared configuration.

17. The method of claim 14 wherein the step of forming a recess includes the step of providing bit guiding means that promote parallel engagement between said modified drill bit and a side edge of an end portion of the gypsum board.

18. The method of claim 13 wherein said step of forming a recess includes the step of providing a tapered modified drill bit.

19. The method of claim 13 wherein the step of forming a recess includes the step of providing vacuum means.

20. A method for tapering gypsum board end portions, said method comprising the steps of:

providing a tool bit having an enlarged end portion and gypsum removal means upon a side periphery of said tool bit, said gypsum removal means extending continuously from said enlarged end portion to a preselected portion of said tool bit;

providing means for rotating said tool bit;

guiding said rotating tool bit between outer walls of a gypsum board, said rotating tool bit initially engaging a side edge of the gypsum board and proceeding laterally through an end portion of the gypsum board such that a longitudinal axis of said tool bit is disposed substantially parallel to the outer walls of the gypsum board until exiting the gypsum board via an opposite side edge whereby a recess with an enlarged inner cavity is formed; and bending at least one recess forming outer wall of the end portion of the gypsum board via said enlarged cavity whereby the end portion of the gypsum board becomes tapered to facilitate a planar seam upon the application of tape and joint compound to the end portion of the gypsum board and to adjacent tapered end portions of adjacent gypsum boards.

\* \* \* \* \*